United States Patent
Lee et al.

(10) Patent No.: US 10,178,933 B2
(45) Date of Patent: Jan. 15, 2019

(54) VACUUM CLEANER

(71) Applicant: LG ELECTRONICS INC., Seoul (KR)

(72) Inventors: Changhoon Lee, Seoul (KR); Gunho Ha, Seoul (KR)

(73) Assignee: LG ELECTRONICS INC., Seoul (KR)

(*) Notice: Subject to any disclaimer, the term of this patent is extended or adjusted under 35 U.S.C. 154(b) by 115 days.

(21) Appl. No.: 14/852,359

(22) Filed: Sep. 11, 2015

(65) Prior Publication Data

US 2016/0088991 A1    Mar. 31, 2016

(30) Foreign Application Priority Data

Sep. 29, 2014  (KR) .................. 10-2014-0129988

(51) Int. Cl.
*A47L 9/28*    (2006.01)

(52) U.S. Cl.
CPC ........... *A47L 9/2831* (2013.01); *A47L 9/2826* (2013.01); *A47L 9/2842* (2013.01); *A47L 9/2868* (2013.01); *A47L 9/2873* (2013.01); *A47L 9/2878* (2013.01); *A47L 9/2884* (2013.01); *Y02B 40/82* (2013.01)

(58) Field of Classification Search
CPC .... A47L 9/2831; A47L 9/2826; A47L 9/2842; A47L 9/2868; A47L 9/2873; A47L 9/2878; A47L 9/2884; Y02B 40/82
See application file for complete search history.

(56) References Cited

U.S. PATENT DOCUMENTS

| | | | | |
|---|---|---|---|---|
| 4,953,253 | A | * | 9/1990 | Fukuda ................ A47L 9/0411 15/319 |
| 5,381,584 | A | * | 1/1995 | Jyoraku ................ A47L 9/2821 15/319 |
| 6,307,358 | B1 | | 10/2001 | Conrad |
| 6,448,732 | B1 | | 9/2002 | Block |
| 6,664,748 | B2 | | 12/2003 | Kushida et al. |
| 2002/0175646 | A1 | | 11/2002 | Kushida et al. |
| 2004/0088817 | A1 | | 5/2004 | Cochran et al. |
| 2008/0309289 | A1 | | 12/2008 | White et al. |

(Continued)

FOREIGN PATENT DOCUMENTS

| CN | 101192686 A | 6/2008 |
|---|---|---|
| CN | 201352719 | 11/2009 |

(Continued)

OTHER PUBLICATIONS

European Search Report dated Mar. 7, 2016 issued in Application No. 15187442.1.

(Continued)

*Primary Examiner* — Robert Scruggs
(74) *Attorney, Agent, or Firm* — Ked & Associates, LLP (57) ABSTRACT

A vacuum cleaner includes a cleaner main body and a brush-less direct current (BLDC) motor that generates a suction force. A suction unit is in communication with the cleaner main body and sucks air and dust, and a battery provides power for the motor. An inverter supplies power of the battery to the motor, and a controller controls an operation of the motor. The controller determines a status of a floor and controls an operation of the motor based on the determined status of the floor.

10 Claims, 6 Drawing Sheets

(56) References Cited

U.S. PATENT DOCUMENTS

| | | | |
|---|---|---|---|
| 2011/0252593 A1* | 10/2011 | Gerhards | A47L 9/2826 15/319 |
| 2012/0081074 A1 | 4/2012 | Cunanan et al. | |
| 2013/0082664 A1 | 4/2013 | Hiraoka et al. | |
| 2014/0245566 A1* | 9/2014 | Conrad | A47L 9/122 15/353 |
| 2014/0312813 A1* | 10/2014 | Murchie | A47L 9/2842 318/400.03 |
| 2016/0064963 A1 | 3/2016 | Huang et al. | |

FOREIGN PATENT DOCUMENTS

| | | |
|---|---|---|
| CN | 102473971 | 5/2012 |
| CN | 202405763 U | 8/2012 |
| CN | 103178564 A | 6/2013 |
| CN | 103545885 A | 1/2014 |
| EP | 0 320 878 A2 | 6/1989 |
| EP | 2 578 130 A1 | 4/2013 |
| GB | 2 442 033 | 3/2008 |
| JP | H 05-095861 A | 4/1993 |
| JP | 2001-224544 A | 8/2001 |
| JP | 2003-135341 A | 5/2003 |
| JP | 2004-057367 | 2/2004 |
| JP | 2004-213400 | 7/2004 |
| JP | 2006-141596 A | 6/2006 |
| JP | 3952361 | 8/2007 |
| JP | 2011250970 A | 12/2011 |
| JP | 2013-230302 | 11/2013 |
| KR | 10-2001-0082640 A | 8/2001 |
| KR | 10-2006-0118796 A | 11/2006 |
| WO | WO 2008/146985 A1 | 12/2008 |
| WO | WO 2013/161068 | 10/2013 |
| WO | WO 2014/000794 | 1/2014 |

OTHER PUBLICATIONS

Korean Office Action dated Sep. 14, 2015 issued in Application No. 10-2014-0129988.
Korean Office Action dated Sep. 18, 2015 issued in Application No. 10-2014-0129989.
Korean Office Action dated Oct. 30, 2015 issued in Application No. 10-2014-0132547.
European Search Report dated Feb. 11, 2016 issued in Application No. 15187412.0.
European Search Report dated Feb. 17, 2016 issued in Application No. 15187700.8.
Chinese Office Action issued in Application 201510531438.7 dated Aug. 1, 2017.
Unites States Office Action dated Aug. 8, 2018 issued in co-pending related U.S. Appl. No. 14/852,421.
United States Office Action dated Apr. 30, 2018 issued in co-pending related U.S. Appl. No. 14/852,331.
Chinese Office Action dated Apr. 25, 2018 issued in Application No. 2015-10531562.3.
U.S. Office Action dated Oct. 18, 2018 issued in U.S. Appl. No. 14/852,331.

* cited by examiner

VACUUM CLEANER

CROSS-REFERENCE TO RELATED APPLICATION

This application claims priority under 35 U.S.C. § 119 and 35 U.S.C. § 365 to Korean Application No. 10-2014-0129988, filed in Korea on Sep. 29, 2014, whose entire disclosure is hereby incorporated by reference.

BACKGROUND

1. Field

The present disclosure relates to a vacuum cleaner.

2. Background

In general, vacuum cleaners are devices that suck air including dust by using a suction force generated by a suction motor mounted on an inside of a main body and then filter the dust in the inside of the main body. Such vacuum cleaners are classified into manual cleaners and robotic cleaners. Manual cleaners are cleaners that a user has to perform cleaning manually, and robotic cleaners are cleaners that perform cleaning automatically while traveling an area to be cleaned. The manual cleaners may be classified into canister type cleaners in which a main body and a suction nozzle are separated from each other and are connected using a connection pipe, and upright type cleaners in which a suction nozzle is combined with a main body.

Korean Unexamined Patent Application Publication No. 10-2006-0118796 (published on Nov. 24, 2006) is prior art literature that discloses a power cord outlet for a cleaner. In the disclosed prior art literature, a cord reel assembly is provided in a main body, and a power cord is connected to an outlet so that power may be supplied to the main body. In the prior art literature, since the cleaner receives power from the cord reel assembly, the cleaner may be moved by a length of a cord wound on the cord reel assembly when cleaning is performed using the cleaner. Thus, there is a limitation in performing cleaning and mobility based on cord length.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
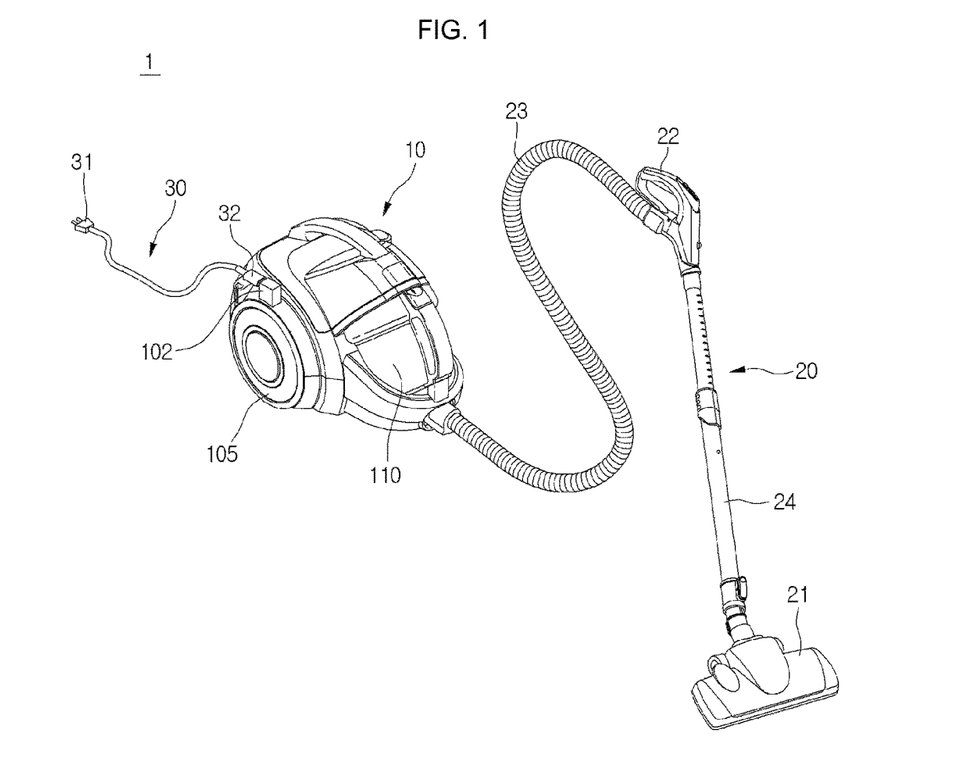
FIG. 1 is a perspective view of a vacuum cleaner according to an embodiment.
Figure 2:
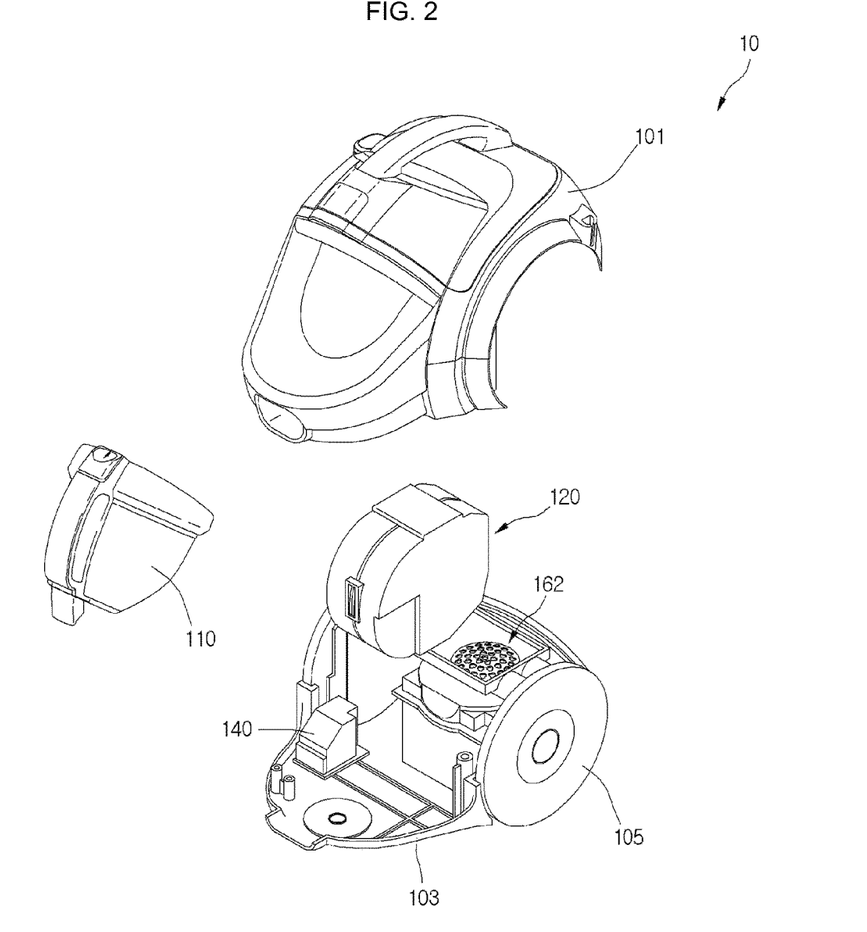
FIG. 2 is an exploded perspective view of a main body of the vacuum cleaner according to an embodiment.
Figure 3:
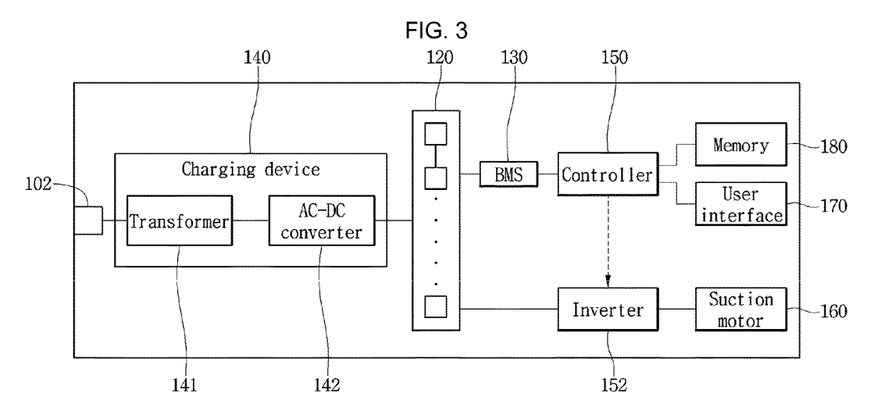
FIG. 3 is a block diagram of a configuration of the vacuum cleaner according to an embodiment.

FIG. 1 is a perspective view of a vacuum cleaner according to an embodiment, and FIG. 2 is an exploded perspective view of a main body of the vacuum cleaner according to an embodiment, and FIG. 3 is a block diagram of a configuration of the vacuum cleaner according to an embodiment. A vacuum cleaner 1 according to an embodiment may include a cleaner main body 10 including a suction motor 160 that generates a suction force, and a suction device 20 that guides air including dust toward the cleaner main body 10.

The suction device 20 may include a suction unit 21 for inhaling dust on a surface to be cleaned, for example, on a floor, and connection units 22, 23, and 24 for connecting the suction unit 21 to the cleaner main body 10. The connection units 22, 23, and 24 may include an extension pipe 24 connected to the suction unit 21, a handle 22 connected to the extension pipe 24, and a suction hose 23 that connects the handle 22 to the cleaner main body 10.

The vacuum cleaner 1 may further include a dust separation unit that separates air and dust sucked by the suction device 20 from each other, and a dust canister 110 that stores dust separated by the dust separation unit. The dust canister 110 may be separably mounted on the cleaner main body 10. The dust separation unit may be manufactured as an element separated from the dust canister 110 or may form one module with the dust canister 110.

The vacuum cleaner 1 may include a battery 120 to store electrical energy such that power for operating the suction motor 160 is provided, a charging device 140 for charging the battery 120, and a power cord 30 that is separably connected to the cleaner main body 10 and supplies commercially available power to the cleaner main body 10. The power cord 30 may include a plug 31 connected to an outlet, and a cord connector 32 connected to the cleaner main body 10. The cleaner main body 10 may include a main body connector 102 to which the cord connector 32 is connected.

The cleaner main body 10 may include a first body 101 and a second body 103 coupled to a lower side of the first body 101. The dust canister 110 may be separably coupled to the first body 101. The main body connector 102 may be provided at the first body 101. Wheels 105 may be coupled to both sides of the second body 103, respectively. The suction motor 160, the battery 120, and the charging device 140 may be installed in the second body 103. The suction motor 160 may be protected by a motor housing 162. The suction motor 160 may be accommodated in the motor housing 162. In this case, the battery 120 may be positioned lateral to the motor housing 162, i.e, lateral to the suction motor 160 to increase spatial efficiency.

The suction motor 160 and the battery 120 may be positioned between a plurality of wheels 105. The battery 120 may be positioned between one among the plurality of wheels 105 and the suction motor 160. The charging device 140 may be disposed to be spaced apart from the battery 120. In another example, the battery 120 may also be provided at the suction unit 21. However, in this case, the connection units 22, 23, and 24 may perform a function of transferring power of the battery 120 to the cleaner main body 10.

The battery 120 includes a plurality of battery cells. The plurality of battery cells may include a chargeable/dischargeable secondary battery. The plurality of battery cells may be connected in series. In the present disclosure, a maximum charging voltage (that is the sum of voltages of the plurality of battery cells) that may be charged in the battery 120 has a value that exceeds 42.4 V, in one example. For example, the maximum charging voltage of the battery 120 may be greater than or equal to 84.8 V.

The charging device 140 performs rectification and smoothing operations, receives a commercially available alternating current (AC) voltage, and converts the commercially available AC voltage into a direct current (DC) voltage. The charging device 140 supplies the converted DC voltage to the battery 120. For example, the charging device 140 converts 220 V or 110 V of commercially available AC voltage into a DC voltage that exceeds 42.4 V (drops a voltage) and supplies the converted DC voltage to the battery 120.

The charging device 140 may include a transformer 141 that transforms an input AC voltage, and an AC-DC converter 142 that converts an AC voltage output from the transformer 141 into a DC voltage. In this case, the DC voltage output from the AC-DC converter 142 may exceed 42.4 V.

In another example, the transformer 141 may transform the DC voltage output from the AC-DC converter 142. In this case, the DC voltage output from the transformer 141 may exceed 42.4 V.

In still another example, the charging device 140 may not include a transformer, and a circuit for preventing the DC voltage output from the AC-DC converter 142 from being transformed into an AC voltage may also be provided. That is, the AC-DC converter 142 may be an insulation type converter. In the current embodiment, an AC-DC converter having a well-known configuration may be used and thus, a detailed description thereof will be omitted.

In the current embodiment, the suction motor 160 may be, e.g., a brush-less direct current (BLDC) motor. A maximum output of the suction motor 160 may be greater than or equal to, e.g., 600 W.

When a voltage charged in the battery 120 is less than or equal to 42.4 V, a current is required to be greater than or equal to at least 14.15 A so that the suction motor 160 having a high output may be operated. Thus, a configuration of a circuit required to drive the suction motor 160 is complicated.

However, according to the current embodiment, since a maximum voltage charged in the battery 120 is greater than or equal to 84.8 V, a minimum current required to operate the suction motor 160 may be smaller than approximately 7.1 A. Thus, the configuration of the circuit required to drive the suction motor 160 is simplified.

According to the current embodiment, the DC voltage that exceeds 42.4 V is output from the charging device 140, and the maximum charging voltage of the battery 120 is greater than or equal to 84.8 V, allowing the suction motor 160 to have a high output. Thus, a suction force of the vacuum cleaner 1 may be increased so that cleaning performance may be improved.

The power cord 30 may be connected to the vacuum cleaner 1 only when the battery 120 is being charged, and when cleaning is performed using the vacuum cleaner 1, the power cord 30 may be separated from the vacuum cleaner 1 and may be advantageously used so that a degree of freedom of mobility of the vacuum cleaner 1 may be improved.

Since the vacuum cleaner 1 does not include a cord reel and receives power from the battery 120, a movement distance or mobility of the vacuum cleaner 1 is not limited, and while the vacuum cleaner 1 is moved, the vacuum cleaner 1 does not need to ride over a cord wound on the cord reel or to be moved while arranging the cord so that the vacuum cleaner 1 may be smoothly moved.

In the current embodiment, since the battery 120 is electrically connected to the main body connector 102 and the maximum charging voltage of the battery 120 is greater than or equal to 84.8 V, if no transformer 141 is provided, contacting the main body connector 102 may be dangerous to a user. However, in the current embodiment, since the charging device 140 includes the transformer 141, the transformer 141 serves as an insulator so that the user's safety may be improved.

The vacuum cleaner 1 may further include a battery management system (BMS) 130. The BMS 130 may detect a status of each of the plurality of battery cells and may transmit the result of detection to a controller 150. In one example, the BMS 130 may detect a voltage of each of the plurality of battery cells. The BMS 130 may maintain a uniform voltage between the plurality of battery cells when each of the plurality of battery cells is charged or discharged.

The vacuum cleaner 1 may include the controller 150 that controls an operation of the suction motor 160. The controller 150 may determine a status of the floor while the vacuum cleaner 1 performs cleaning and may control the operation of the suction motor 160 based on the status of the floor. In one example, the controller 150 may control an intensity of a suction force of the suction motor 160 based on the status of the floor.

The vacuum cleaner 1 further includes an inverter 152 that supplies power of the battery 120 to the suction motor 160. The inverter 152 may include a plurality of switching elements, and the controller 150 may control switching of the inverter 152 so as to control an operation of the suction motor 160. In the present specification, controlling the suction motor 160 by using the controller 150 will be understood that the controller 150 controls switching of the inverter 152.

The vacuum cleaner 1 may further include a user interface 170. Operation instructions of the vacuum cleaner 1 may be input through the user interface 170, and the user interface 170 may display operation information or status information of the vacuum cleaner 1.

The user interface 170 may be provided at one or more of the handle 22 and the cleaner main body 10. The user interface 170 may be provided in a shape in which an input unit and a display unit are integrally formed, or may include an input unit and a display unit separately. The user interface 170 may include an informing unit from which a voice is output. Power on, a cleaning mode, and an intensity of the suction force of the vacuum cleaner 1 may be selected using the input unit. The display unit may display at least information regarding the remaining amount of the battery 120.

In one example, the intensity of the suction force may be set stepwise to strong (this being a case in which the suction force is the maximum), medium, and weak (this being a case in which the suction force is the minimum), and the intensity of the suction force of the suction motor 160 may be selected through the input unit. In the present specification, the intensity of the suction force has been described to be controlled in three steps. However, it will be noted that the number of steps for classifying the intensity of the suction force is not limited.

The controller 150 may control the display unit to display information regarding the necessity of charging of the battery 120 when the remaining amount of the battery 120 reaches a reference voltage. The reference voltage may be stored in a memory 180.

In another example, the display unit may display the remaining amount of the battery 120 continuously or stepwise. For example, the display unit may display the remaining amount of the battery 120 in the form of numbers, symbols or graphs. Alternatively, the display unit may include a plurality of light-emitting units and may display the remaining amount of the battery 120 by changing the number of turned on units among the plurality of light-emitting units. Alternatively, the display unit may display the remaining amount of the battery 120 by changing colors of lights irradiated from the plurality of light-emitting units.

Figure 4:
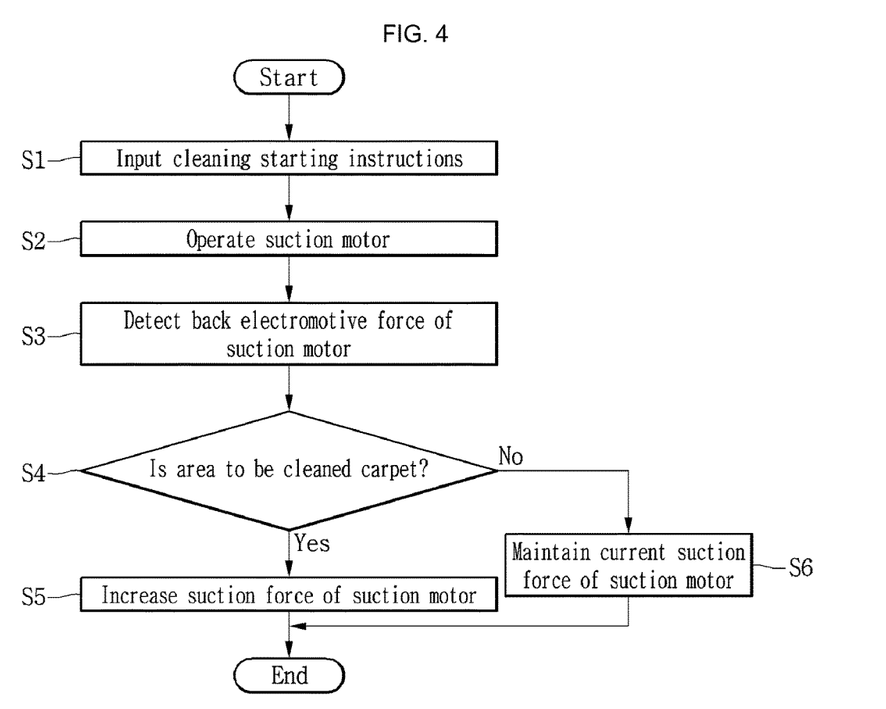
FIG. 4 is a flowchart illustrating a method of controlling a suction motor based on a status of a floor according to an embodiment.

FIG. 4 is a view illustrating a method of controlling a suction motor based on a status of the floor according to an embodiment. Referring to FIGS. 1 through 4, cleaning starting instructions may be input through the user interface 170, and the intensity of the suction force of the suction motor 160 may be selected through the user interface 170 (S1).

The controller 150 operates the suction motor 160 with the selected intensity of the suction force of the suction motor 160 (S2). In detail, the controller 150 controls the rotation speed of the suction motor 160 to correspond to the selected intensity of the suction force of the suction motor 160.

A back electromotive force may be generated in the suction motor 160 while the suction motor 160 is rotated, and the controller 150 may detect the back electromotive force (S3). The controller 150 determines a current of the suction motor 160 based on the back electromotive force and determines the status of the floor based on the determined current.

Hereinafter, a case where the vacuum cleaner 1 performs cleaning of a living room floor and a carpet in a state in which the intensity of the suction force is set to any one of a plurality of steps, will be described. In the present specification, it is assumed that a back electromotive force of the suction motor 160 when the vacuum cleaner 1 performs cleaning of the floor, such as the living room floor having a smooth surface (e.g., hardwood flooring, vinyl flooring, or tile flooring), is referred to as a first back electromotive force and a back electromotive force of the suction motor 160 when the vacuum cleaner 1 performs cleaning of a floor covering, such as the carpet, is referred to as a second back electromotive force.

When the vacuum cleaner 1 performs cleaning of the floor, such as the living room floor, the amount of air that flows by an operation of the suction motor 160 is large, whereas, when the vacuum cleaner 1 performs cleaning of a floor covering, such as the carpet, the amount of air that flows by the operation of the suction motor 160 is small. The first back electromotive force is larger than the second back electromotive force and the back electromotive force of the suction motor 160 differs according to the status of the floor cleaned by the vacuum cleaner 1. The back electromotive force is proportional to a current of the suction motor 160.

In a state in which the intensity of the suction force is set as one of a plurality of steps, when the vacuum cleaner 1 cleans the floor and then is moved to the carpet, bristles in the carpet serve to restrict air flow so that the amount of air sucked into the vacuum cleaner 1 is small and the suction force of the suction motor 160 is lowered. In the present disclosure, the controller 150 may perform a controlling operation to prevent the suction force from being lowered when the vacuum cleaner 1 cleans a floor covering, such as the carpet.

The controller 150 determines whether an area to be cleaned is a floor covering, such as the carpet, based on the detected back electromotive force of the suction motor 160 (S4). In detail, the controller 150 determines the status of the floor by comparing a current of the suction motor determined by the detected back electromotive force of the suction motor 160 with a reference current. If the current of the suction motor 160 is less than the reference current, the controller 150 determines that the area to be cleaned is a floor covering, such as the carpet, and if the current of the suction motor 160 exceeds the reference current, the controller 150 determines that the area to be cleaned is the floor, such as the living room floor.

The reference current may be set as a value between a first current of the suction motor 160 determined based on the first back electromotive force and a second current of the suction motor 160 based on the second back electromotive force. As a result of the determination in operation S4, when the area to be cleaned is not a floor covering, such as the carpet, the controller 150 controls the suction motor 160 so that a current suction force of the suction motor 160 may be maintained (S6). The controller 150 controls the suction motor 160 so that a current operation status of the suction motor 160 may be maintained.

On the other hand, as a result of the determination in operation S4, when the area to be cleaned is a floor covering, such as the carpet, the controller 150 controls the suction motor 160 so that the suction force of the suction motor 160 may be increased (S5). The controller 150 controls the suction motor 160 so that rotation speed of the suction motor 160 may be increased. If the rotation speed of the suction motor 160 is increased, a current applied to the suction motor 160 may be increased. Thus, an output of the suction motor 160 may be increased. When the vacuum cleaner 1 is moved again to the floor, such as the living room floor, while cleaning a floor covering, such as the carpet, the controller 150 may control the suction motor 160 so that the rotation speed of the suction motor 160 may be its original speed.

According to the current embodiment, the suction force of the suction motor 160 when a floor covering, such as the carpet, is cleaned, may be similar to or larger than the suction force of the suction motor 160 when the floor, such as the living room floor, is cleaned. Thus, a required suction force may be maintained even on a floor covering, such as the carpet, so that cleaning performance may be improved and a cleaning time may be reduced.

In the above-described embodiment, the controller 150 compares the current determined based on the back electromotive force with the reference current. However, unlike this, the controller 150 may also determine the status of the floor by comparing the back electromotive force itself with reference power.

Figure 5:
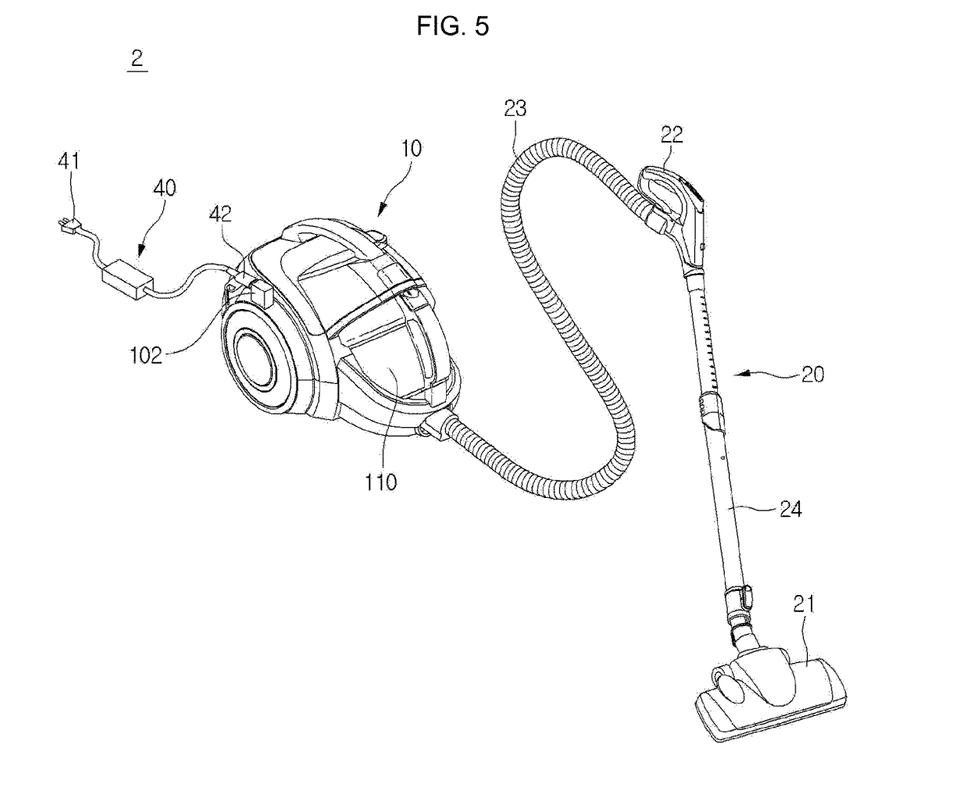
FIG. 5 is a perspective view of a vacuum cleaner according to another embodiment.
Figure 6:
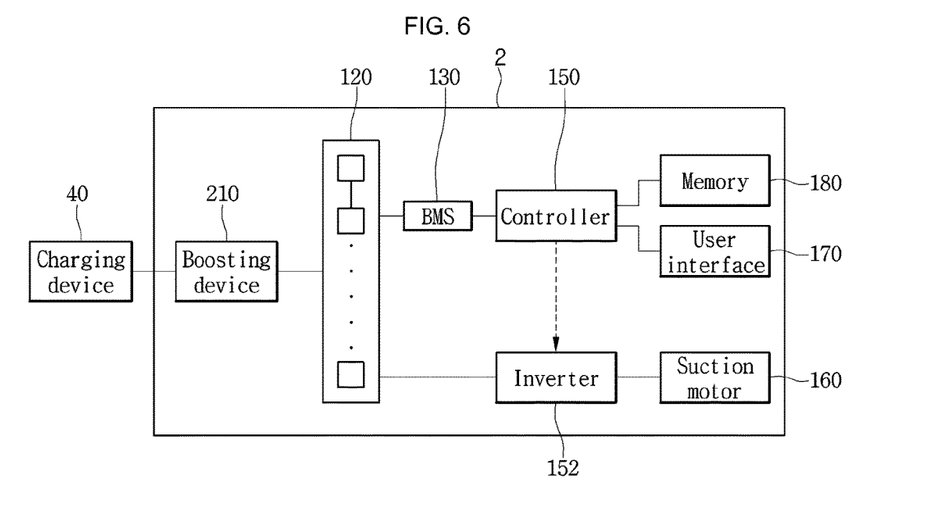
FIG. 6 is a block diagram of a configuration of the vacuum cleaner illustrated in FIG. 5.

FIG. 5 is a perspective view of a vacuum cleaner according to another embodiment, and FIG. 6 is a block diagram of a configuration of the vacuum cleaner illustrated in FIG. 5. The other portions of the current embodiment are the same as those of the previous embodiment except that a charging device is separably connected to the vacuum cleaner. Thus, hereinafter, only characteristic portions of the current embodiment will be described.

Referring to FIGS. 5 and 6, a vacuum cleaner 2 according to the current embodiment may include a cleaner main body 10 and a charging device 40 that is separably connected to the cleaner main body 10 and performs charging of the battery 120. The charging device 40 may include a power cord 41 connected to an outlet and a charging device connector 42 connected to the cleaner main body 10. The cleaner main body 10 may include a main body connector 102 to which the charging device connector 42 is connected.

The charging device 40 performs rectification and smoothing operations, receives a commercially available AC voltage, and converts the commercially available AC voltage into a DC voltage. The charging device 40 supplies the converted DC voltage to the cleaner main body 10. For example, the charging device 40 converts 220V of commercially available AC voltage into a DC voltage that is less than or equal to 42.4V and supplies the converted DC voltage to the cleaner main body 10.

Since the DC voltage that is less than or equal to 42.4V is output from the charging device connector 42 of the charging device 40, there is no problem in the user's safety even when no insulating device is provided at the charging device connector 42. Of course, an insulating device may be provided at the charging device connector 42.

In the current embodiment, in order to operate the suction motor 160 having a high output by using a voltage charged in the battery 120, the cleaner main body 10 may further include a boosting device 210 that boosts a voltage by receiving the DC voltage that is less than or equal to 42.4V from the charging device 40.

A boost converter may be used as an example of the boosting device 210. However, it will be noted that, in the current embodiment, a configuration of the boosting device 210 is not limited. In the current embodiment, the DC voltage that is less than or equal to 42.4V input to the boosting device 210 is boosted by two times or more so that a voltage that is greater than or equal to 84.8V may be charged in the battery 120.

The boost converter may include an inductor, a diode, a capacitor, and a switching element. The switching element is repeatedly turned on/off at a high speed by control of the controller 150 so that the boost converter may boost an input voltage.

In this case, the switching element may be configured of a metal oxide semiconductor field effect transistor (MOSFET). However, embodiments of the present disclosure are not limited thereto, and the switching element may also be configured of a bipolar junction transistor (BJT) or an insulated gate bipolar transistor (IGBT).

In another example, a transformer may be additionally provided between the boosting device and the battery 120. If no transformer is provided, the main body connector 102 may be insulated, and if the transformer is provided, the transformer serves as an insulating device. Thus, the main body connector 102 may not be insulated.

As described above, a canister type cleaner has been described as a cleaner. However, the teachings of the present disclosure may be applied to an upright type cleaner. In this case, a battery that supplies power to a suction motor may be provided at a suction unit or a cleaner main body. Also, the above-described charging device or power cord may also be provided at the suction unit or the cleaner main body.

The present disclosure is directed to a vacuum cleaner that is capable of being conveniently moved. The present disclosure is also directed to a vacuum cleaner in which a suction force of a suction motor is capable of being controlled based on a status of a floor.

According to the present disclosure, vacuum cleaner includes a cleaner main body; a suction motor that is disposed in the cleaner main body and is a brushless direct current (BLDC) motor that generates a suction force; a suction unit that is in communication with the cleaner main body and sucks air and dust; a battery that supplies power to the suction motor; an inverter that supplies power of the battery to the suction motor; and a controller that controls an operation of the suction motor, wherein the controller may determine a status of a floor and may control an operation of the suction motor based on the determined status of the floor.

According to the present disclosure, a vacuum cleaner may also comprise a cleaner main body including a suction motor for generating a suction force; a suction unit that is in communication with the cleaner main body and sucks air and dust; a battery that supplies power to the suction motor; and a controller that controls an operation of the suction motor, wherein the controller may detect a back electromotive force generated in the suction motor, and when the back electromotive force is reduced while the suction motor operates, the controller may increase the suction force of the suction motor.

According to the present disclosure, a vacuum cleaner includes a cleaner main body including a suction motor for generating a suction force; a suction unit that is in communication with the cleaner main body and sucks air and dust; a battery that supplies power to the suction motor; and a controller that controls an operation of the suction motor, wherein, when the cleaner main body is moved to a floor in a second status while cleaning a floor in a first status, the controller may change the suction force of the suction motor.

In the description of embodiments, terms such as "first," "second," "A," "B," "(a)," "(b)" or the like may be used herein when describing components of the present disclosure. Each of these terms is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

The present disclosure is related to U.S. application Ser. Nos. 14/852,331 and 14/852,421, both filed on Sep. 11, 2015, whose entire disclosures are incorporated herein by reference.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vacuum cleaner comprising:
a cleaner main body;
a brush-less direct current (BLDC) motor that generates a suction force and disposed in the cleaner main body;
a suction unit that is in communication with the cleaner main body and sucks air and dust based on the suction force;
a battery to store electrical energy;
an inverter that supplies a power of the battery to the BLDC motor; and
a controller that controls an operation of the BLDC motor, wherein the controller detects a back electromotive force generated in the BLDC motor, and
wherein the controller determines a current of the BLDC motor based on the back electromotive force, the controller compares the determined current with a reference current,
wherein when the determined current based on the back electromotive force is greater than or equal to a reference current, the controller maintains a suction force of the BLDC motor, and
when the determined current based on the back electromotive force is less than the reference current, the controller increases the suction force of the BLDC motor,
wherein the controller determines a surface type being cleaned by the current based on the back electromotive force,
wherein the reference current is set as a value between a first current of the BLDC motor determined based on a first back electromotive force and a second current of the BLDC motor based on a second back electromotive force, and
wherein the first back electromotive force is generated when the vacuum cleaner performs cleaning of a floor in a first status, and
wherein the second back electromotive force is generated when the vacuum cleaner performs cleaning of a floor in a second status.

2. The vacuum cleaner according to claim 1, wherein the controller changes an operation of the BLDC motor depending on whether the surface type is changed.

3. The vacuum cleaner according to claim 1, wherein the back electromotive force is generated in the BLDC motor while the BLDC motor operates, and the controller determines the surface type based on the back electromotive force.

4. The vacuum cleaner according to claim 1, wherein, when the determined current is greater than or equal to the reference current in a state in which the suction force of the BLDC motor is increased, the controller controls the BLDC motor so that the suction force is a suction force in the previous state of the BLDC motor.

5. The vacuum cleaner according to claim 1, further comprising:
a charging device separably connected to the cleaner main body and charges the battery; and
a boosting device that increases a voltage output from the charging device and supplies the increased voltage to the battery.

6. The vacuum cleaner according to claim 1, further comprising:
a charging device that is disposed in the cleaner main body and configured to charge the battery; and
a power cord separably connected to the cleaner main body and supplies external power to the charging device.

7. The vacuum cleaner according to claim 1, further comprising connection units that connect the suction unit and the cleaner main body, wherein the battery is disposed in the cleaner main body.

8. A vacuum cleaner comprising:
a cleaner main body having a suction motor to generate a suction force;
a suction unit that is in communication with the cleaner main body and sucks air and dust based on the suction force;
a battery configured to provide power for the suction motor; and
a controller that controls an operation of the suction motor,
wherein the controller detects a back electromotive force generated in the suction motor wherein the controller determines a current of the suction motor based on the back electromotive force, the controller compares the determined current with a reference current,
wherein when the determined current based on the back electromotive force is greater than or equal to a reference current, the controller maintains a suction force of the suction motor, and
when the determined current based on the back electromotive force is less than the reference current, the controller increases the suction force of the suction motor,
wherein the controller determines a surface type being cleaned by the current based on the back electromotive force,
wherein the reference current is set as a value between a first current of the suction motor determined based on a first back electromotive force and a second current of the suction motor based on a second back electromotive force, and
wherein the first back electromotive force is generated when the vacuum cleaner performs cleaning of a floor in a first status, and
wherein the second back electromotive force is generated when the vacuum cleaner performs cleaning of a floor in a second status.

9. The vacuum cleaner according to claim 8, wherein when the back electromotive force of the motor is increased after the suction force has been increased, the controller controls the motor so that the suction force of the motor is returned to its original state.

10. The vacuum cleaner according to claim 8, wherein the controller increases a rotation speed of the motor so as to increase the suction force generated by the motor.

* * * * *